United States Patent
Wu et al.

(10) Patent No.: US 10,430,044 B2
(45) Date of Patent: *Oct. 1, 2019

(54) METHOD, SYSTEM AND COMPUTER STORAGE MEDIUM FOR DISPLAYING MICROBLOG WALL

(71) Applicant: TENCENT TECHNOLOGY (SHENZHEN) COMPANY LIMITED, Shenzhen (CN)

(72) Inventors: Xiangbo Wu, Shenzhen (CN); Jian Li, Shenzhen (CN); Jian Zhang, Shenzhen (CN); Lei Wei, Shenzhen (CN); Bin Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/991,841

(22) Filed: May 29, 2018

(65) Prior Publication Data

US 2018/0275849 A1     Sep. 27, 2018

Related U.S. Application Data (63) Continuation of application No. 14/022,164, filed on Sep. 9, 2013, now Pat. No. 10,013,148, which is a (Continued)

(30) Foreign Application Priority Data

Mar. 9, 2011    (CN) .......................... 2011 1 0055414

(51) Int. Cl.
*G06F 3/0484* (2013.01)
*H04L 12/18* (2006.01)
(Continued)

(52) U.S. Cl.
CPC ........ *G06F 3/0484* (2013.01); *H04L 12/1827* (2013.01); *H04L 65/1089* (2013.01); *H04W 4/21* (2018.02)

(58) Field of Classification Search
CPC ......... H04L 51/26; H04L 51/24; H04L 67/26; H04L 51/32; H04L 51/12; H04L 65/1089;
(Continued)

(56) References Cited

U.S. PATENT DOCUMENTS 8,566,712 B1   10/2013   Varian
8,719,357 B2 *   5/2014   Wang ..................... H04L 51/32
                                                                        709/206
(Continued)

FOREIGN PATENT DOCUMENTS

CN       101034996 A     9/2007
CN       101262494 A     9/2008
(Continued)

OTHER PUBLICATIONS

Buzeck, "Micro-Blogging Services: An Approach to Supply Situated Public Displays with User-Generated Content," Disloma Thesis in Geoinformatics at Westfalische Wilhelms—Universitat Munster, Nov. 2009, pp. 1-81.

(Continued)

*Primary Examiner* — Stephen S Hong
*Assistant Examiner* — Ahamed I Nazar
(74) *Attorney, Agent, or Firm* — Anova Law Group, PLLC (57) ABSTRACT

Method, system and computer storage medium for displaying microblog wall are disclosed. The method includes: obtaining microblog messages of a specified topic; obtaining a set display duration of the microblog messages; pulling the microblog messages according to a specified time interval; displaying the pulled microblog messages according to the (Continued)

corresponding display duration. By obtaining the set display duration of the microblog messages and pulling the microblog messages according to the specified time interval, the method, system and computer storage medium for displaying microblog wall may control the display duration of the microblog messages and prevent the chaos from occurring during the displaying of microblog messages.

20 Claims, 2 Drawing Sheets

Related U.S. Application Data continuation of application No. PCT/CN2012/070915, filed on Feb. 7, 2012.

(51) Int. Cl.
*H04W 4/21* (2018.01)
*H04L 29/06* (2006.01)

(58) Field of Classification Search
CPC ............... H04L 12/1827; G06F 9/542; G06F 17/30867; G06F 2201/86; G06F 2209/545; G06F 3/0484; H04W 4/21
See application file for complete search history.

(56) References Cited

U.S. PATENT DOCUMENTS

| | | | | |
|---|---|---|---|---|
| 8,832,188 B1* | 9/2014 | Cierniak | ................ | H04L 51/32 709/204 |
| 2003/0134678 A1* | 7/2003 | Tanaka | ................... | G06F 3/048 463/42 |
| 2005/0144246 A1* | 6/2005 | Malik | ................. | G06Q 10/107 709/206 |
| 2005/0165743 A1* | 7/2005 | Bharat | ................. | G06F 16/9535 |
| 2006/0239248 A1* | 10/2006 | Hawk | ................... | G06F 3/0483 370/352 |
| 2007/0214477 A1* | 9/2007 | Read | .................. | H04N 21/2381 725/38 |
| 2008/0086755 A1* | 4/2008 | Darnell | .............. | H04N 5/44543 725/105 |
| 2008/0282155 A1* | 11/2008 | Kempanna | .......... | G06F 16/9535 715/273 |
| 2010/0064007 A1 | 3/2010 | Randall | | |
| 2010/0077407 A1* | 3/2010 | Luu | ........................ | H04L 67/325 719/318 |
| 2010/0211868 A1* | 8/2010 | Karmarkar | ........ | H04M 1/72547 715/234 |
| 2011/0179020 A1 | 7/2011 | Ozzie et al. | | |
| 2011/0191694 A1 | 8/2011 | Coleman et al. | | |
| 2012/0042020 A1 | 2/2012 | Kolari et al. | | |
| 2012/0066212 A1* | 3/2012 | Jennings | ................ | H04L 67/22 707/723 |
| 2012/0089681 A1* | 4/2012 | Chowdhury | ........ | H04L 12/6418 709/206 |

FOREIGN PATENT DOCUMENTS

| | | |
|---|---|---|
| CN | 101551959 A | 10/2009 |
| CN | 101656617 A | 2/2010 |
| WO | 2009046277 A1 | 4/2009 |

OTHER PUBLICATIONS

Ryan et al., "Twitterspace: A Co-Developed Display Using Twitter to Enhance Community Awareness," online Oct. 1, 2008, pp. 230-233.
Patent Examination Report No. 1, dated Nov. 5, 2014, issued in Australian Patent Application No. 2012225062, 8 pages.

* cited by examiner

METHOD, SYSTEM AND COMPUTER STORAGE MEDIUM FOR DISPLAYING MICROBLOG WALL

This is a continuation application of U.S. patent application Ser. No. 14/022,164, filed on Sep. 9, 2013. U.S. patent application Ser. No. 14/022,164 is a continuation of International Application No. PCT/CN2012/070915, filed on Feb. 7, 2012, entitled "METHOD, SYSTEM AND COMPUTER STORAGE MEDIUM FOR DISPLAYING MICROBLOG WALL," which claims priority from Chinese Patent Application No. 201110055414.0, filed on Mar. 9, 2011, entitled "METHOD FOR DISPLAYING MICROBLOG WALL AND SYSTEM THEREOF," the entire content of all of which are incorporated herein by reference.

FIELD OF THE INVENTION

The present disclosure relates to the field of message processing, and more particularly to a method and system for displaying microblog wall and a computer storage medium.

BACKGROUND OF THE INVENTION

Microblog wall refers to a big screen for displaying microblog messages of a specified topic in events such as exhibition, concert, wedding, etc. The big screen can synchronously display text messages sent by the participants on the spot and microblog messages sent by cyber friends, which enable the live and online audiences to deliver and obtain the latest event information.

In the traditional display technique of the microblog wall display, a microblog webpage of a specified topic is normally opened and projected onto a screen, and the real-time interaction is achieved by setting a time interval on a browser to update the webpage. The user just need to send microblog messages to the specified topic, and the messages will be then displayed by a front page.

However, in the traditional display technique of the microblog wall, the webpage is updated at a certain time interval, and old messages will be replaced by new messages in every update. If there are many new messages to be shown in a short time, the old messages will be replaced by the new messages. The display duration of old messages will be very short, and thus the old messages can not be completely shown to the audience.

Therefore, heretofore unaddressed needs exist in the art to address the aforementioned deficiencies and inadequacies.

SUMMARY OF THE INVENTION

It is an object of the present disclosure to provide a method for displaying microblog wall, which can control the display duration of messages.

According to an aspect of the disclosure, a method for displaying microblog wall includes the steps of:

obtaining microblog messages of a specified topic;

obtaining a set display duration of the microblog messages;

pulling the microblog messages according to a specified time interval; and displaying the pulled microblog messages according to the corresponding display duration.

Preferably, the step of obtaining microblog messages of a specified topic includes at least one of the following steps:

pulling the microblog messages of the specified topic through a keyword search interface;

pulling the microblog messages of the specified topic through a microblog interface; and pulling the microblog messages of the specified topic through a mobile communication terminal interface.

Preferably, after the step of obtaining microblog messages of a specified topic, the method further includes: screening the microblog messages to select the microblog messages related to the specified topic.

Preferably, after the step of obtaining a set display duration of the microblog messages, the method further includes: obtaining a set display manner of the microblog messages, and the display manner is sticky or preempted display.

Preferably, the method further includes:

obtaining published time of the microblog messages;

before the step of pulling the microblog messages according to the specified time interval, and the method further includes: sorting the microblog messages according to the display manner and the published time of the microblog messages to form a microblog message queue; and the step of pulling the microblog messages according to the specified time interval includes: pulling the microblog messages from the microblog message queue according to the specified time interval.

Preferably, the method further includes: the step of obtaining a set style of a display webpage; and the step of displaying the pulled microblog messages according to the corresponding display duration includes: displaying the pulled microblog messages according to the corresponding display duration and the style of the display webpage.

Preferably, the style of the display webpage includes a preset background image and a banner, and the step of displaying the pulled microblog messages according to the corresponding display duration includes: displaying the pulled microblog messages according to the corresponding display duration with setting the preset background image and the banner as a background of the display webpage.

It is a further aspect of the disclosure to provide a system for displaying microblog wall, which can control the display duration of the messages.

According to a further aspect of the disclosure, a system for displaying microblog wall includes:

a message obtaining module, configured to obtain microblog messages of a specified topic;

a parameter obtaining module, configured to obtain a set display duration of the microblog messages;

a pulling module, configured to pull the microblog messages according to the specified time interval; and a displaying module, configured to display the pulled microblog messages according to the corresponding display duration.

Preferably, the message obtaining module includes at least one of a search interface, a microblog interface and a mobile communication terminal interface, for pulling the microblog messages of the specified topic.

Preferably, the system further includes a screening module, configured to screen the microblog messages to select the microblog messages related to the specified topic.

Preferably, the parameter obtaining module is further configured to obtain a set display manner of the microblog messages, and the display manner is sticky or preempted displaying.

Preferably, the system further includes a sorting module, and the message obtaining module is further configured to obtain published time of the microblog messages, and the sorting module is configured to sort the microblog messages according to the display manner and the published time of the microblog messages, to form a microblog message queue; the pulling module is further configured to pull the microblog messages from the microblog message queue according to the specified time interval.

Preferably, the parameter obtaining module is further configured to obtain a set style of the display webpage, and the displaying module is configured to display the pulled microblog messages according to the corresponding display duration and the style of the display webpage.

Preferably, the style of display webpage includes a preset background image and a banner, and the displaying module is further configured to display the pulled microblog messages according to the corresponding display duration with setting the preset background image and the banner as the background of the display webpage.

Furthermore, it is still a further aspect of the disclosure to provide a computer storage medium which can control the display duration of messages.

A computer storage medium storing computer executable instructions to execute a method for displaying microblog wall, and the method includes the steps of:

obtaining microblog messages of a specified topic;
obtaining a set display duration of the microblog messages;
pulling the microblog messages according to the specified time interval; and
displaying the pulled microblog messages according to the corresponding display duration.

By obtaining the set display duration of the microblog messages and pulling the microblog messages according to the specified time interval, the method, system, and computer storage medium for displaying microblog wall can control the display duration of the microblog messages and prevent the chaos from occurring in displaying microblog messages.

DETAILED DESCRIPTION OF THE PREFERRED EMBODIMENTS

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure.

Figure 1:
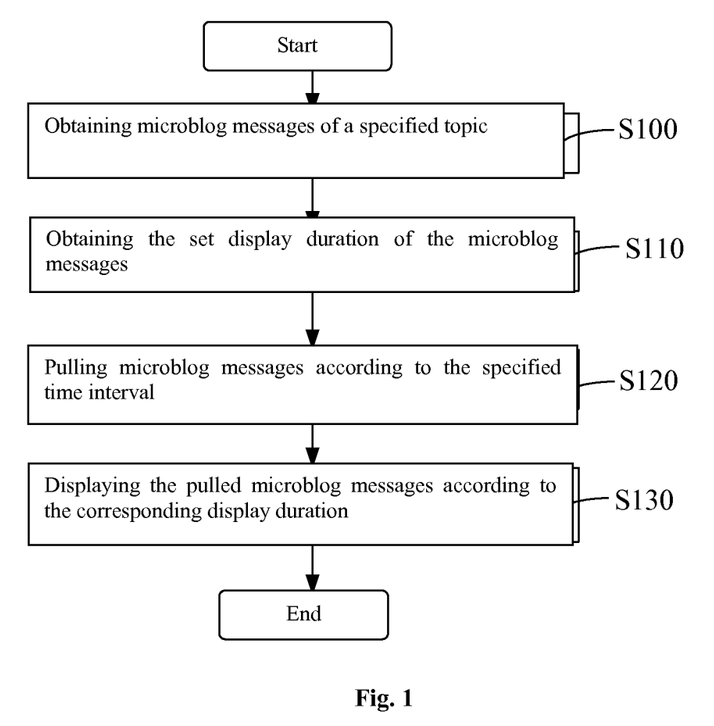
FIG. 1. is a flow chart of a method for displaying microblog wall according to one embodiment of the present disclosure.

As shown in FIG. 1, in one embodiment, a method for displaying microblog wall includes the following steps.

Step S100, obtain microblog messages of a specified topic.

The microblog wall is a screen for displaying microblog messages of a specified topic. To enable the audience to participate the interaction of the specified topic, it is necessary to obtain the microblog messages related to the specified topic in real-time manner. The specified topic can be various topics, such as celebration of the Chinese Spring Festival.

In one embodiment, the step S100 can be at least one of the following steps.

(1) Pull the microblog messages of the specified topic through a keyword search interface.

Based on the keyword searching, the relative microblog messages are pulled from the Internet, for example, the key word is "Spring Festival".

(2) Pull the microblog messages of the specified topic through a microblog interface.

The microblog messages published by the audience according to the specified topic, or the microblog messages related to the specified topic published by logging on to the user's account are both pulled through the microblog interface. For example, the user can publish the microblog messages on the microblog topic of Spring Festival Gala. The user can log on to his private account to publish microblog messages about Spring Festival wishes, and these microblog messages will be pulled through the microblog interface.

(3) Pull the microblog messages of the specified topic through a mobile communication terminal interface.

The user may send the microblog messages by using a mobile communication terminal to a special service number, for example, the user may send the spring festival wishes to the special service number 1066XXXX by a mobile phone. In addition, one specified topic may have different special service numbers according to telecommunication operators. The microblog messages are pulled and sent to the special service number though the mobile communication terminal interface.

At the same time of the step S100, the method further includes the step of obtaining published time of the microblog messages. When the audience publishes the microblog message, the system will record the published time. While obtaining the microblog messages of the specified topic, the published time of the microblog messages is also obtained, so that the microblog messages may be displayed in order according to the published time of the microblog messages.

After the step of S100, the method further includes: screening the microblog messages to select the microblog messages related to the specified topic. The obtained microblog messages may contain some microblog messages which are not related to the specified topic, and the microblog messages related to the specified topic are selected during the screening process. While the obtained microblog messages are screened, the message status is recorded through buffer area (e.g. cookie), and highlighted to avoid the repeating of screening. The screening of the microblog messages related to the specified topic before displaying, will improve the usage rate of screen.

Step S110, a set display duration of the microblog messages is obtained. The display duration of the microblog messages may be set according to the need. For example, the display time of the microblog messages on the screen may be 10 seconds, 20 seconds, 30 seconds, etc. If the specified topic is "Celebration of Spring Festival", the display duration may be set as 30 seconds for the microblog message of "Wish All People Happiness and Wealth", and the display duration may be set as 10 seconds for the microblog message of "Wish Your Family a Happy New Year". Furthermore, when there is image information contained in the microblog message, a set time for enlarging the image may be obtained.

In a preferred embodiment, after the step of S110, the method further includes the step of: obtaining a set display manner of the microblog messages, and the display manner is sticky or preempted display. When the display style of the microblog message is set to be sticky, it means the microblog messages can stay on the display webpage for a long time, while other messages cannot be displayed, and when it needs to proceed to display other micoblog messages, the setting of sticky display style of the microblog message should be cancelled. When the display style of the microblog message is set as preempted displaying, it means the microblog message is displayed on the top of the microblog messages to be displayed, preferably on the display webpage.

In a preferred embodiment, after the step S110, the method further includes the step of: sorting the microblog messages according to the display manner and the published time of the microblog messages, to form a microblog message queue. The microblog messages form the microblog message queue according to published time, when the display style of the microblog message is the preempted display, the microblog message is set on the top of the microblog message queue. When the display style of the microblog message is sticky, the microblog message is set on the top of the microblog message queue, and the display duration is set at a relatively large value such that the display duration is longer, achieving the sticky effect. The microblog messages in the microblog message queue may be changed or deleted.

Step S120, the microblog messages are pulled according to a specified time interval.

The display webpage of microblog wall can be updated at the specified time interval to pull the microblog messages. When the microblog messages are processed to form the microblog message queue, the step S120 is: pulling the microblog messages from the microblog message queue according to the specified time interval. One or several microblog messages may be pulled from the microblog message queue according to the specified time interval. That is, the pulling of the microblog messages is started from 0 minute 0 hour, and then after the time interval t (e.g. 5 seconds), the microblog messages are pulled again, and then after another the time interval t, the microblog messages are pulled once again, and proceed in this manner.

Step S130, the pulled microblog messages are displayed according to the corresponding display duration.

The pulled microblog messages will be displayed on the display webpage according to the corresponding display duration.

In a preferred embodiment, the method for displaying microblog wall further includes the step of: obtaining a set style of the display webpage. Step S130 is changed into: displaying the pulled microblog messages according to the corresponding display duration and the style of the display webpage. The style of the display webpage can be a preset background image and a banner of the display webpage, and the step S130 is implemented by: displaying the pulled microblog messages according to the corresponding display duration with setting the preset background image and the banner as the background of the display webpage. The banner can be multiple images that can be changed in turn at preset time interval, and the content of the banner can be designed by the topic designer. Alternatively, a CSS style of the display webpage can be set by Cascading Style Sheet (CSS) editing area, and the CSS is a group of format setting rules, and it is used to control the appearance of the Web webpage. Furthermore, a white list may be set to the display webpage, that is, some users are allowed to access the display webpage.

Figure 2:
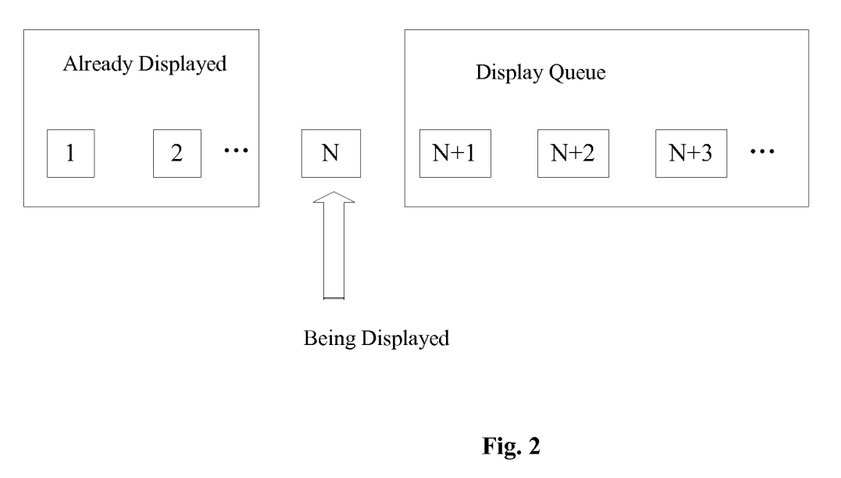
FIG. 2. is an exemplary diagram of the status of microblog messages in a microblog message queue.

Moreover, when the microblog messages are pulled from the microblog message queue to display on the microblog wall according to the above method, there are several status of the microblog messages from the microblog message queue. As shown in FIG. 2, the specified time interval of the pulled microblog message is subtracted from the display duration of the microblog message to get a difference value. If the difference value is smaller than 0 and the microblog message has been pulled, it means the microblog message has been displayed. If the difference value is bigger than 0 and the microblog message has been pulled, it means the microblog message is being displayed. If the difference value is bigger than 0 and the microblog message has not been pulled, it means the microblog message is going to be displayed. If the difference value is bigger than 0 and the microblog message has been pulled, the same microblog message will be pulled again in the next pulling until the difference value between its display duration and the time interval is smaller than 0, and thus the display duration of the microblog message is an integral multiple of the interval time of pulling. After pulling a microblog message, judge whether it is the same microblog message as the previously pulled microblog message. If it is the same, then the display webpage will not be updated. If it is different, the newly pulled microblog message will be placed on the top of the display webpage. The judgment on whether they are the same microblog messages is implemented by verifying and comparing of the information abstracts (e.g. md5 code) of the microblog messages.

Figure 3:
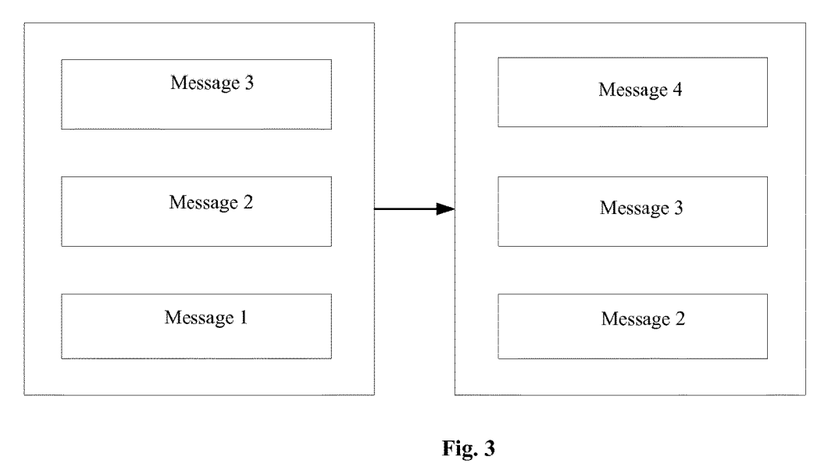
FIG. 3 is an exemplary diagram of the microblog message display.

As shown in FIG. 3, three microblog messages are pulled at a time and displayed on the webpage at the beginning, and one microblog message is pulled at each specified time interval. If the pulled microblog message is judged to be a new microblog message 4, then lower the microblog message 3 and the microblog message 2, while the microblog message 4 is displayed on the top, and the old microblog message 1 is no longer displayed. A rolling effect is thus obtained.

Furthermore, a computer storage medium storing computer executable instructions is further provided. The computer executable instructions are to execute a method for displaying microblog wall. The method for displaying microblog wall executed by the computer executable instructions in the computer storage medium has been described in the above description.

Figure 4:
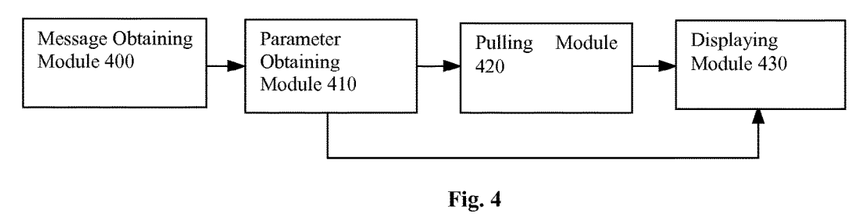
FIG. 4 is a structural diagram of a system for displaying microblog wall according to one embodiment of the present disclosure.

As shown in FIG. 4, in one embodiment, a system for displaying microblog wall includes a message obtaining module 400, a parameter obtaining module 401, a pulling module 420 and a displaying module 430.

The message obtaining module 400 is configured to obtain the microblog messages of the specified topic. The microblog wall is a screen for displaying microblog messages of the specified topic. To allow the audience to participate interaction of a specified topic, it is necessary to obtain the microblog messages related to the specified topic in real-time manner. The specified topic can be various topics, such as celebration of the Chinese Spring Festival. Furthermore, the message obtaining module 400 is configured to obtain the published time of the micoblog messages. When the microblog messages are published by the audience, the system will automatically record the published time. When the microblog messages of the specified topic are obtained by the message obtaining module 400, the published time of the microblog messages can be obtained simultaneously, so that the microblog messages may be displayed in order according to the published time of the microblog messages.

In one embodiment, the message obtaining module 400 includes at least one of a search interface, a microblog interface and a mobile communication terminal interface, for pulling the microblog messages of the specified topic.

(1) The microblog messages of the specified topic are pulled by the search interface.

Based on the keyword (e.g. Spring Festival), the relative microblog messages can be pulled from the Internet.

(2) The microblog messages of the specified topic are pulled by the microblog interface.

The microblog messages published by the audience according to the specified topic, or the microblog messages related to the specified topic by logging on to the user's account are both pulled through the microblog interface. For example, the user publishes microblog messages on the microblog topic of Spring Festival Gala, or the user logins to his private account to publish the microblog message about spring festival wishes, and the system may pull these microblog messages through the microblog interface.

(3) The microblog messages of the specified topic are pulled by the mobile communication terminal interface.

The user sends the microblog messages to a special service number by using the mobile communication terminal interface. For example, the user may send the Spring Festival wishes to the special service number 1066XXXX by a mobile phone. One specified topic may have different special service numbers according to different telecommunication operators. The system may pull the microblog messages sent to the special service number through the mobile communication terminal interface.

The parameter obtaining module 410 is configured to obtain the set display duration of the microblog messages. The display duration of the microblog messages is set according to the need, for example, the time for displaying the microblog messages on the screen may be 10 seconds, 20 seconds, 30 seconds, etc. The specified topic is, for example, "Celebration of Spring Festival", the display duration of the microblog message of "Wish All People Happiness and Wealth" may be set at 30 seconds, while the display duration of the microblog message of "Wish Your Family a Happy New Year" may be set at 10 seconds. The set display duration of the microblog messages may be obtained by the parameter obtaining module 410. Furthermore, when there is image information contained in the microblog message, the set time for enlarging the image may be obtained, and the character font size of messages can be changed.

Furthermore, in one embodiment, the parameter obtaining module 410 is further configured to obtain the set display manner of the microblog messages, and the display manner is sticky or preempted display. When the display style of the microblog message is set as sticky, it means the microblog message can stay on the display webpage for a long time, while other messages cannot be displayed, and when it is necessary to proceed to display other microblog messages, the sticky display of the microblog message should be cancelled. When the display style of the microblog message is set as preempted display, it means the microblog message is displayed on the top of the microblog messages to be displayed, and preferably on the displayed webpage.

Furthermore, in one embodiment, the parameter obtaining module 410 is further configured to obtain the set style of the display webpage. The style of the display webpage can include a preset background image and a banner of the display webpage. The banner can be multiple images which can be changed in turn at a preset time interval. The content of the banner can be designed by the topic designer. However, a CSS style of the display webpage can be set by Cascading Style Sheet (CSS) editing area, and the CSS is a group of format setting rules, and it is used to control the appearance of the Web webpage. Furthermore, a white list of the display webpage may be set, which allows some users to access the display webpage.

The pulling module 420 is configured to pull the microblog messages according to the specified time interval. The display webpage of microblog wall may be updated at the specified time interval to pull the microblog messages. For example, the pulling of the microblog message is started from 0 minute 0 hour, then after a time interval t (e.g. 5 seconds), microblog messages are pulled again, and after a further time interval t, microblog messages are pulled once again, and proceed in this manner.

The displaying module 430 is configured to display the pulled microblog messages according to the corresponding display duration. When the set style of the display webpage is obtained by the parameter obtaining module 410, the displaying module 430 is further configured to display the pulled microblog message according to the corresponding display duration and the style of the display webpage. If the style of the display webpage includes the preset background image and the banner, then the displaying module 430 will display the pulled microblog messages according to the corresponding display duration with setting the preset background image and the banner as the background of the display webpage.

Figure 5:
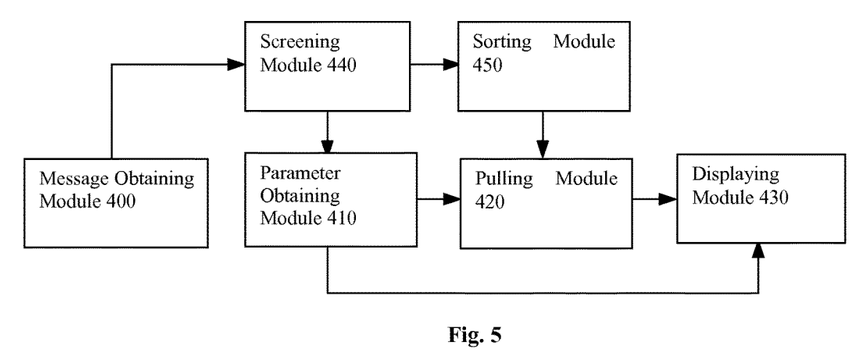
FIG. 5 is a structural diagram of a system for displaying microblog wall according to a further embodiment of the present disclosure.

In one embodiment, as shown in FIG. 5, the system for displaying microblog wall further includes a screening module 440 and a sorting module 450, in addition to the message obtaining module 400, the parameter obtaining module 410, the pulling module 420 and the displaying module 430.

The screening module 440 is configured to screen the microblog messages to select the microblog messages related to the specified topic. The microblog messages obtained by the message obtaining module 400 may contain some microblog messages that are not related to the specified topic. The microblog messages related to the specified topic are selected after the screening process of the screening module 440. When the obtained microblog messages are screened by the screening module 440, the screened message status is recorded by a buffer area (e.g. cookie), and highlighted to avoid the repeating of screening. The screened microblog messages that are related to the specified topic are then displayed. This improves the usage rate of screen.

The sorting module 450 is configured to sort the microblog messages according to the display manner and the published time of the microblog messages, to form a microblog message queue. The microblog messages form the microblog message queue according to the published time. When the display style of the microblog message is the preempted display, the microblog message is set on the top of the microblog message queue by the sorting module 450. When the display style of the microblog message is sticky, the microblog message is set on the top of the microblog message queue by the sorting module 450, and the display duration is set at a relatively large value, and thereby the longer display duration may be obtained, such that the message is maintained sticky. The microblog messages of the microblog message queue may be changed or deleted.

The pulling module 420 is also configured to pull the microblog messages from the microblog message queue according to the specified time interval.

When the microblog message is pulled by the system from the microblog message queue to display on the microblog wall, there are several status of the microblog messages in the microblog message queue. As shown in FIG. 2, the specified time interval of the pulled microblog message is subtracted from the display duration of the microblog message to get a difference value. If the difference value is smaller than 0 and the microblog message has been pulled, it means the microblog message has been displayed. If the difference value is bigger than 0 and the microblog message has been pulled, it means the microblog message is being displayed. If the difference value is bigger than 0 and the microblog message has not been pulled, it means the microblog message is going to be displayed. If the difference value is bigger than 0 and the microblog message has been pulled, the same microblog message will be pulled again in the next pulling, and the pulling of the same microblog message is stopped when the difference value between the display duration and the past time intervals. The display duration of the microblog message is an integral multiple of the time interval of pulling. After a microblog message is pulled by the pulling module 420, the judgment on whether it is the same microblog message as the previously pulled microblog message is carried out. If it is the same, the display webpage will not be updated by the displaying module 430. Otherwise, the newly pulled microblog message will be disposed on the top of the display webpage by the displaying module 430. The judgment on whether they are the same microblog message is implemented by verifying and comparing the information abstract (e.g. md5 code) of microblog messages.

By obtaining the set display duration of the microblog message and pulling the microblog messages according to the specified time interval, the method, system and computer storage medium for displaying microblog wall can control the display duration of the microblog message and prevent the chaos from occurring during the displaying of microblog messages.

Furthermore, the microblog messages of the specified topic may be obtained by multiple ways, which is convenient for the user to participate the topic, and thereby the ways to obtain the microblog messages are enriched. The obtained microblog messages are screened to delete the microblog message irrelative to the specified topic, which improves the quality in displaying the microblog messages. Moreover, the display manner of the microblog messages may be obtained to control the ways of displaying the microblog messages.

The embodiments are chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for displaying microblog wall, comprising:
obtaining microblog messages of a specified topic;
obtaining set display durations of the microblog messages;
pulling the microblog messages from a microblog message queue according to a specified time interval; and
displaying the pulled microblog messages according to the display durations,
wherein pulling the microblog messages comprises:
   obtaining a difference value by subtracting the specified time interval from a first display duration of a first microblog message from the microblog message queue;
   if the difference value is greater than 0 and the first microblog message is not pulled, pulling the first microblog message and updating the first display duration to be equal to the difference value for a next pulling event;
   if the difference value is greater than 0 and the first microblog message has been pulled, pulling the first microblog message again and updating the first display duration to be equal to the difference value for the next pulling event; and
   if the difference value is less than or equal to 0 and the microblog message has been pulled, stopping pulling the first microblog message.

2. The method according to claim 1, further comprising:
after pulling the first microblog message, determining whether the first microblog message is the same as a previously pulled microblog message by comparing an information abstract of the first microblog message and an information abstract of the previously pulled microblog message;
updating a display webpage with the first microblog message if the first microblog message is different from the previously pulled microblog message; and
maintaining the display webpage without update if the first microblog message is the same as the previously pulled microblog message.

3. The method according to claim 1, further comprising:
obtaining display manners of the microblog messages;
wherein the display manners includes a sticky display and a preempted display;
obtaining published times of the microblog messages; and
before pulling the microblog messages according to the specified time interval and displaying the pulled microblog messages, sorting the microblog messages according to the display manners and the published times of the microblog messages, to form the microblog message queue.

4. The method according to claim 3, wherein sorting the microblog messages comprises:
forming the microblog message queue according to the published times of the microblog messages;
when a display manner of a second microblog message is the preempted display, setting the second microblog message at a top of the microblog message queue; and
when the display manner of the second microblog message is the sticky display, setting the second microblog message at the top of the microblog message queue with a second display duration corresponding to the sticky display.

5. The method according to claim 1, wherein obtaining the microblog messages of the specified topic comprises at least one of:

pulling the microblog messages of the specified topic through a keyword search interface;
pulling the microblog messages of the specified topic through a microblog interface; or
pulling the microblog messages of the specified topic through a mobile communication terminal interface.

6. The method according to claim 1, further comprising:
obtaining a set style of a display webpage;
wherein displaying the pulled microblog messages comprises: displaying the pulled microblog messages according to the corresponding display durations and the style of the display webpage.

7. The method according to claim 6, wherein:
the style of the display webpage comprises a preset background image and a banner, and
displaying the pulled microblog messages comprises:
displaying the pulled microblog messages according to the corresponding display durations on the display webpage having the preset background image and the banner as a background.

8. An apparatus for displaying microblog wall, comprising:
a memory; and
a processor coupled to the memory, wherein the processor is configured to perform:
obtaining microblog messages of a specified topic;
obtaining set display durations of the microblog messages;
pulling the microblog messages from a microblog message queue according to a specified time interval; and
displaying the pulled microblog messages according to the display durations,
wherein pulling the microblog messages comprises:
obtaining a difference value by subtracting the specified time interval from a first display duration of a first microblog message from the microblog message queue;
if the difference value is greater than 0 and the first microblog message is not pulled, pulling the first microblog message and updating the first display duration to be equal to the difference value for a next pulling event;
if the difference value is greater than 0 and the first microblog message has been pulled, pulling the first microblog message again and updating the first display duration to be equal to the difference value for the next pulling event; and
if the difference value is less than or equal to 0 and the microblog message has been pulled, stopping pulling the first microblog message.

9. The apparatus according to claim 8, wherein the processor is further configured to perform:
after pulling the first microblog message, determining whether the first microblog message is the same as a previously pulled microblog message by comparing an information abstract of the first microblog message and an information abstract of the previously pulled microblog message;
updating a display webpage with the first microblog message if the first microblog message is different from the previously pulled microblog message; and
maintaining the display webpage without update if the first microblog message is the same as the previously pulled microblog message.

10. The apparatus according to claim 8, wherein the processor is further configured to perform:
obtaining display manners of the microblog messages; wherein the display manners includes a sticky display and a preempted display;
obtaining published times of the microblog messages; and
before pulling the microblog messages according to the specified time interval and displaying the pulled microblog messages, sorting the microblog messages according to the display manners and the published times of the microblog messages, to form the microblog message queue.

11. The apparatus according to claim 10, wherein sorting the microblog messages comprises:
forming the microblog message queue according to the published times of the microblog messages;
when a display manner of a second microblog message is the preempted display, setting the second microblog message at a top of the microblog message queue; and
when the display manner of the second microblog message is the sticky display, setting the second microblog message at the top of the microblog message queue with a second display duration corresponding to the sticky display.

12. The apparatus according to claim 8, wherein obtaining the microblog messages of the specified topic comprises at least one of:
pulling the microblog messages of the specified topic through a keyword search interface;
pulling the microblog messages of the specified topic through a microblog interface; or
pulling the microblog messages of the specified topic through a mobile communication terminal interface.

13. The apparatus according to claim 8, wherein the processor is further configured to perform:
obtaining a set style of a display webpage;
wherein displaying the pulled microblog messages comprises: displaying the pulled microblog messages according to the corresponding display durations and the style of the display webpage.

14. The apparatus according to claim 13, wherein:
the style of the display webpage comprises a preset background image and a banner, and
displaying the pulled microblog messages comprises:
displaying the pulled microblog messages according to the corresponding display durations on the display webpage having the preset background image and the banner as a background.

15. A non-transitory computer storage medium storing computer readable instructions, when being executed, the computer readable instructions cause at least one processor to perform:
obtaining microblog messages of a specified topic;
obtaining set display durations of the microblog messages;
pulling the microblog messages from a microblog message queue according to a specified time interval; and
displaying the pulled microblog messages according to the display durations,
wherein pulling the microblog messages comprises:
obtaining a difference value by subtracting the specified time interval from a first display duration of a first microblog message from the microblog message queue;
if the difference value is greater than 0 and the first microblog message is not pulled, pulling the first microblog message and updating the first display duration to be equal to the difference value for a next pulling event;

if the difference value is greater than 0 and the first microblog message has been pulled, pulling the first microblog message again and updating the first display duration to be equal to the difference value for the next pulling event; and if the difference value is less than or equal to 0 and the microblog message has been pulled, stopping pulling the first microblog message.

16. The storage medium according to claim 15, wherein the computer readable instructions further cause at least one processor to perform:

after pulling the first microblog message, determining whether the first microblog message is the same as a previously pulled microblog message by comparing an information abstract of the first microblog message and an information abstract of the previously pulled microblog message;

updating a display webpage with the first microblog message if the first microblog message is different from the previously pulled microblog message; and maintaining the display webpage without update if the first microblog message is the same as the previously pulled microblog message.

17. The storage medium according to claim 15, wherein the computer readable instructions further cause at least one processor to perform:

obtaining display manners of the microblog messages; wherein the display manners includes a sticky display and a preempted display;

obtaining published times of the microblog messages; and before pulling the microblog messages according to the specified time interval and displaying the pulled microblog messages, sorting the microblog messages according to the display manners and the published times of the microblog messages, to form the microblog message queue.

18. The storage medium according to claim 17, wherein sorting the microblog messages comprises:

forming the microblog message queue according to the published times of the microblog messages;

when a display manner of a second microblog message is the preempted display, setting the second microblog message at a top of the microblog message queue; and when the display manner of the second microblog message is the sticky display, setting the second microblog message at the top of the microblog message queue with a second display duration corresponding to the sticky display.

19. The storage medium according to claim 15, wherein obtaining the microblog messages of the specified topic comprises at least one of:

pulling the microblog messages of the specified topic through a keyword search interface;

pulling the microblog messages of the specified topic through a microblog interface; or pulling the microblog messages of the specified topic through a mobile communication terminal interface.

20. The storage medium according to claim 15, wherein the computer readable instructions further cause at least one processor to perform:

obtaining a set style of a display webpage, the set style comprising a preset background image and a banner;

wherein displaying the pulled microblog messages comprises: displaying the pulled microblog messages according to the corresponding display durations on the display webpage having the preset background image and the banner as a background.

* * * * *